No. 867,456. PATENTED OCT. 1, 1907.
W. S. WEEDON.
ELECTRODE FOR ARC LAMPS AND METHOD OF MAKING THE SAME.
APPLICATION FILED DEC. 10, 1903.
WITNESSES:
INVENTOR:
William S. Weedon,
By Albert G. Davis
Att'y.

UNITED STATES PATENT OFFICE.

WILLIAM S. WEEDON, OF SCHENECTADY, NEW YORK, ASSIGNOR TO GENERAL ELECTRIC COMPANY, A CORPORATION OF NEW YORK.

ELECTRODE FOR ARC-LAMPS AND METHOD OF MAKING THE SAME.

No. 867,456.    Specification of Letters Patent.    Patented Oct. 1, 1907.

Application filed December 10, 1903. Serial No. 184,653.

*To all whom it may concern:*

Be it known that I, WILLIAM S. WEEDON, a citizen of the United States, residing at Schenectady, in the county of Schenectady and State of New York, have invented certain new and useful Improvements in Electrodes for Arc-Lamps and Methods of Making the Same, of which the following is a specification.

The object of my present invention is the production of an improved electrode for use in arc lamps.

I have discovered that with electrodes formed out of or containing a large amount of the sub-oxid of titanium a luminous arc is obtained which gives a large amount of white light.

In the accompanying drawing I have shown in elevation an electrode constructed in accordance with my invention.

In preparing electrodes containing sub-oxid of titanium I prefer to proceed in the following manner: an intimate mixture of about seven parts of rutile ($TiO_2$) with rather more than one part of carbon is formed. This mixture, when heated to a proper reducing temperature, somewhere between 1500° and 2000° C., is converted into titanium sub-oxid. Before or after converting the mixture into titanium sub-oxid it is formed into pencils or the like which serve as the lamp electrodes. These pencils may be formed by first adding water, preferably containing a little glycerin, to the powdered mixture to render it pasty and then molding or pressing them into the desired shape.

The titanium sub-oxid formed in the manner described is dark bluish in color and the electrodes formed from it are homogeneous and possess considerable mechanical strength. As titanium sub-oxid is a good conductor of electricity at ordinary temperatures, the electrodes formed out of it do not ordinarily require any special treatment to increase their conductivity; when used, however, a non-conducting film may be formed at their arc ends which may necessitate special starting devices.

As the luminosity of the arc from electrodes formed of or containing titanium sub-oxid is so great that no reliance need be placed upon the light given from electrodes heated to incandescence, I have found that with a negative electrode of titanium sub-oxid the positive electrode may preferably be formed of some good conducting metal, such as copper. The positive electrode should be so proportioned that it will not be heated by the arc to a temperature which will result in its injurious oxidation.

It will be observed that, with the proportions stated, a slight excess of carbon is employed in the mixture over that necessary to give the theoretical reaction between titanium oxid and carbon resulting in titanium sub-oxid. This is desirable in order to obtain the best results.

While substantially the entire amount of rutile in the mixture is converted into titanium sub-oxid, a small amount may be converted into metallic titanium and a small amount may retain its original form of titanium oxid. The presence of small amounts of either or both of these substances in the electrodes, however, is of but slight if any disadvantage.

Instead of forming electrodes composed entirely or practically so of titanium sub-oxid, I may make electrodes out of a mixture containing more or less of titanium sub-oxid and various other materials.

What I claim as new and desire to secure by Letters Patent of the United States, is,

1. An arc lamp electrode containing the sub-oxid of titanium.

2. An electrode containing an electrically conductive oxid of titanium.

3. The method which consists in forming a mixture containing approximately seven parts of rutile and one part of carbon, forming electrodes out of the mixture, and then heating the electrodes to convert the mixture into titanium sub-oxid.

4. The method which consists in forming a mixture containing substantially seven parts of titanium oxid and one part of carbon, forming electrodes out of the mixture, and prior to the completion of the electrodes converting the mixture into titanium sub-oxid.

5. An arc lamp electrode formed of an oxid of titanium conducting at ordinary temperatures.

6. An electrode containing a chemical combination of titanium and oxygen in which the proportion of titanium to oxygen is greater than in the titanium oxid ($TiO_2$).

In witness whereof, I have hereunto set my hand this 7th day of December, 1903.

WILLIAM S. WEEDON.

Witnesses:
BENJAMIN B. HULL,
BURTON C. ANTHONY.